United States Patent
Ando et al.

[11] Patent Number: 5,784,136
[45] Date of Patent: Jul. 21, 1998

[54] PDLC DEVICE AND METHOD OF MAKING, WITH LIQUID CRYSTAL MICROCAPSULES HAVING A UNIFORM DIAMETER

[75] Inventors: Masahiko Ando, Hitachinaka; Shinichi Komura, Hitachi; Makoto Tsumura, Hitachi; Yoshiharu Nagae, Hitachi, all of Japan

[73] Assignee: Hitachi, Ltd., Tokyo, Japan

[21] Appl. No.: 709,738

[22] Filed: Sep. 9, 1996

[30] Foreign Application Priority Data

Sep. 20, 1995 [JP] Japan ................... 7-241231

[51] Int. Cl.$^6$ .................. G02F 1/1333; C09K 19/60
[52] U.S. Cl. .................. 349/86; 349/92; 349/165
[58] Field of Search .................. 349/86, 89, 90, 349/165, 92

[56] References Cited

U.S. PATENT DOCUMENTS

| | | | |
|---|---|---|---|
| 5,011,624 | 4/1991 | Yamagishi et al. | 349/89 |
| 5,056,898 | 10/1991 | Ma et al. | 349/89 |
| 5,096,282 | 3/1992 | Margerum et al. | 349/86 |
| 5,394,256 | 2/1995 | Yamada et al. | 349/90 |
| 5,410,424 | 4/1995 | Konuma et al. | 349/90 |
| 5,530,567 | 6/1996 | Takei | 349/89 |
| 5,585,947 | 12/1996 | Havens et al. | 349/90 |
| 5,619,353 | 4/1997 | Yamazaki et al. | 349/89 |
| 5,619,354 | 4/1997 | Shimizu et al. | 349/89 |

*Primary Examiner*—William L. Sikes
*Assistant Examiner*—Toan Ton
*Attorney, Agent, or Firm*—Antonelli, Terry, Stout & Kraus, LLP

[57] ABSTRACT

A liquid crystal layer composing a liquid crystal display apparatus is formed by being laminated with a plurality of single particle layers of liquid crystal micro-capsules having a uniform size and being arranged in a two-dimensional crystal array, the liquid crystal micro-capsule being formed by cladding a liquid crystal droplet with a medium having a constant thickness. The liquid crystal micro-capsule is formed by being cladded with a medium composed of gelatine and gum arabic. Further, the single particle layer has a filling medium for making the surface flat and filling the gaps among the liquid crystal micro-capsules. The filling medium is composed of gelatine and gum arabic.

23 Claims, 6 Drawing Sheets

$$V_s / V_{ns}(N) = \frac{\sqrt{\sqrt{N}+1}}{\sqrt{\sqrt{N}-1}}$$

SCANNING ELECTODE NUMBER (N)

Vs / Vns

FIG. 6

Vs / Vns

SUBSTRATE BRING-UP SPEED

FIG. 7A

LOW BRING-UP SPEED

FIG. 7B

HIGH BRING-UP SPEED

PDLC DEVICE AND METHOD OF MAKING, WITH LIQUID CRYSTAL MICROCAPSULES HAVING A UNIFORM DIAMETER

BACKGROUND OF THE INVENTION

The present invention relates to a construction and a method of manufacturing a liquid crystal display apparatus of the light dispersing type.

A liquid crystal display apparatus of the light dispersing type is described in, for example, "Active Matrix Polymer Dispersed Liquid Crystal Display" by Z. Yaniv et al, Proceeding of the International Display Research Conference, Japan Display pp. 572–575 (1989). The liquid crystal display apparatus of the light dispersing type is a thin display apparatus in which fine liquid droplets composed of, generally, nematic liquid crystals are dispersed in a polymer medium, and a displayed image is formed by utilizing dispersion and absorption of incident light by means of a, so-called, polymer dispersed liquid crystal (PDLC). Since the display apparatus does not require any polarizing plate, the brightness of the display apparatus can be nearly three times as bright as that of a conventional display apparatus using twisted nematic liquid crystals. Since the back light of the display apparatus accordingly consumes only a small amount of electric power and can be driven by a battery, the display apparatus of this type is expected to be used for a portable terminal or the like.

However, in the conventional technology for the display apparatus of this type, since the gradient of the transmission rate to applied voltage, that is, the threshold characteristic, is small, it is impossible to employ the direct-multiplexed driving method in which only opposite electrodes intersecting with each other at right angle are used. Therefore, it is necessary to employ the active-matrix driving method in which a thin film transistor (TFT) or a switching element, such as a MIM, is disposed in each intersection of the opposed electrodes. In this driving method, the consuming electric power is increased and the manufacturing cost is also increased due to the complexity of the apparatus.

The reason why the threshold of the polymer dispersed liquid crystal is gradual is that, in the light dispersing layer composed of a polymer medium and liquid crystal droplets dispersed in the medium, the size distribution of the liquid crystal droplets is non-uniform, and the thickness ratio of the liquid crystal and the medium in the cross section of the light dispersion layer varies depending on the position. This reason can be understood from the following explanation. The threshold characteristic of the polymer dispersed liquid crystal is an averaged value of many threshold characteristics of liquid crystal droplets dispersed in the polymer medium. The threshold voltage of an orientation change exhibited by a single liquid crystal droplet is determined by the size of the liquid crystal droplet (the threshold voltage increases as the size decreases). Further, with respect to the voltage applied to an optical control layer, the magnitude of voltage actually applied to the liquid crystal droplet is determined by the thickness ratio of the liquid crystal and the medium in the cross section of the light dispersion layer. Therefore, when there are deviations in the size of the liquid crystal droplets and in the thickness ratio, the liquid crystal droplets are individually orientated, and accordingly the threshold characteristic of the whole light dispersion layer becomes gradual.

SUMMARY OF THE INVENTION

An object of the present invention is to provide a liquid crystal display apparatus and a method of manufacturing the liquid crystal display apparatus, in which the transmission rate in resource to an applied voltage sharply changes.

Another object of the present invention is to provide a liquid crystal display apparatus and a method of manufacturing the liquid crystal display apparatus, which can be driven by direct-multiplexed driving using a liquid crystal of the light dispersing type.

According to the liquid crystal display apparatus, the liquid crystal layer is formed by being laminated with a plurality of single particle layers of liquid crystal microcapsules having a uniform size and being arranged in a two-dimensional crystal array, and the liquid crystal microcapsule is formed by cladding a liquid crystal droplet with a medium having a constant thickness.

It is preferable when the liquid crystal micro-capsule is formed by cladding a nematic liquid crystal with a medium composed of gelatine and gum arabic. Further, the nematic liquid crystal may have a light absorbing dye added thereto.

The single particle layer has a filling medium for making the surface flat and filling the gaps among the liquid crystal micro-capsules. It is preferable when the filling medium is the same material as the medium used for the cladding of the liquid crystal micro-capsules and is composed of gelatine and gum arabic.

In the single particle layer, the liquid crystal droplet size is uniform and the thickness ratio of the liquid crystal and the medium in the cross section of the light dispersion layer at an arbitrary position is nearly constant. Therefore, all of the liquid crystal droplets are orientated at the same time with an equal applied voltage, and accordingly the transmission rate change to the applied voltage, that is, the threshold characteristic, becomes sharp.

These and other objects, features and advantages of the present invention will be understood more clearly from the following detailed description with reference to the accompanying drawings.

BRIEF DESCRIPTION OF THE DRAWINGS

FIGS. 7A and 7B are diagrams showing arrangements in single particle layers, where

DETAILED DESCRIPTION OF THE PREFERRED EMBODIMENTS

Embodiments of the present invention will be described in detail below, referring to the accompanying drawings.

Figure 1:
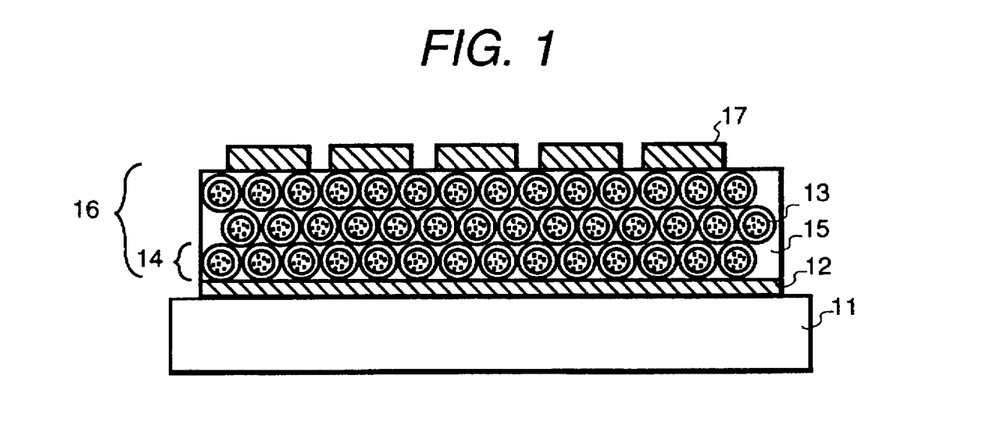
FIG. 1 is a cross-sectional view of a liquid crystal display apparatus.

FIG. 1 shows a cross section of the main portion of a liquid crystal display apparatus in accordance with the present invention. On a substrate 11 having a thickness of nearly 1 mm made of corning 7059 glass or a plastic, a light dispersion layer 16 composed of lower scanning electrodes 12, a laminated film of single particle layers 14 having liquid crystal microcapsules 13 arranged in a two-dimensional crystal array (closest arrangement) and a medium 15 filling the gaps among the laminated layers, and upper signal electrodes 17 are successively laminated. As can be understood from the figure, the liquid crystal display apparatus is constructed by the laminated film of single particle layers in which liquid crystal micro-capsules having a uniform size and formed of liquid crystal droplets cladded with a medium having a constant thickness are closely arranged in each plane. Therefore, the liquid crystal droplet size is uniform and the thickness ratio of the liquid crystal and the medium in the cross section of the light dispersion layer at any arbitrary position is constant.

A method of manufacturing the aforementioned liquid crystal display apparatus will be described below. The liquid crystal micro-capsules 13 having a uniform size are formed in the following way. Nematic liquid crystal is suspended in a hydrophilic polymer liquid of gelatine and gum arabic to be dispersed into micro-droplets having a diameter above 3 µm. Cladding films having a thickness of nearly 1 µm are formed onto the surfaces of the micro-droplets of the liquid crystal through the core-sellvation method of conventional technology. By adding a curing agent, such as aldehyde, to the solution, the cladding films are cured to produce the liquid crystal microcapsules 13. By passing the produced liquid crystal microcapsules through a porous filter (for example, MPG, a product of Ashahi Glass Co., Ltd.) having a porous diameter of 5 µm, liquid crystal micro-capsules having a diameter of 5 µm can be selected. Through another method, the liquid crystal microcapsules having a uniform diameter of 5 µm can be formed. For example, nematic liquid crystal particles having a uniform particle diameter of 3 µm, obtained by use of a porous filter having a porous diameter of 3 µm, are cladded in the hydrophilic polymer suspending solution through the coresellvation method.

Next, the single particle layer 14 can be formed by closely arranging the liquid crystal micro-capsules 13 (hereinafter, referred to as "LCMC") having a uniform particle diameter onto a flat plate in the manner described as follows. A glass substrate 11 is used having a thickness of 1 mm on which the lower scanning electrodes 12 in the form of a set of plural stripe transparent electrodes are formed. The lower scanning electrode 12 is formed by depositing tin oxide to which is added indium (ITO) of 5% to a thickness of approximately 140 nm. The substrate is immersed into a pure water solution in which the LCMC are suspended are suspended, and the substrate is then raised out of the solution at a constant speed in an environment where the solution is evaporated at a constant speed to form the single particle film 14 onto the surface of the substrate.

Figures 3A, 3B:
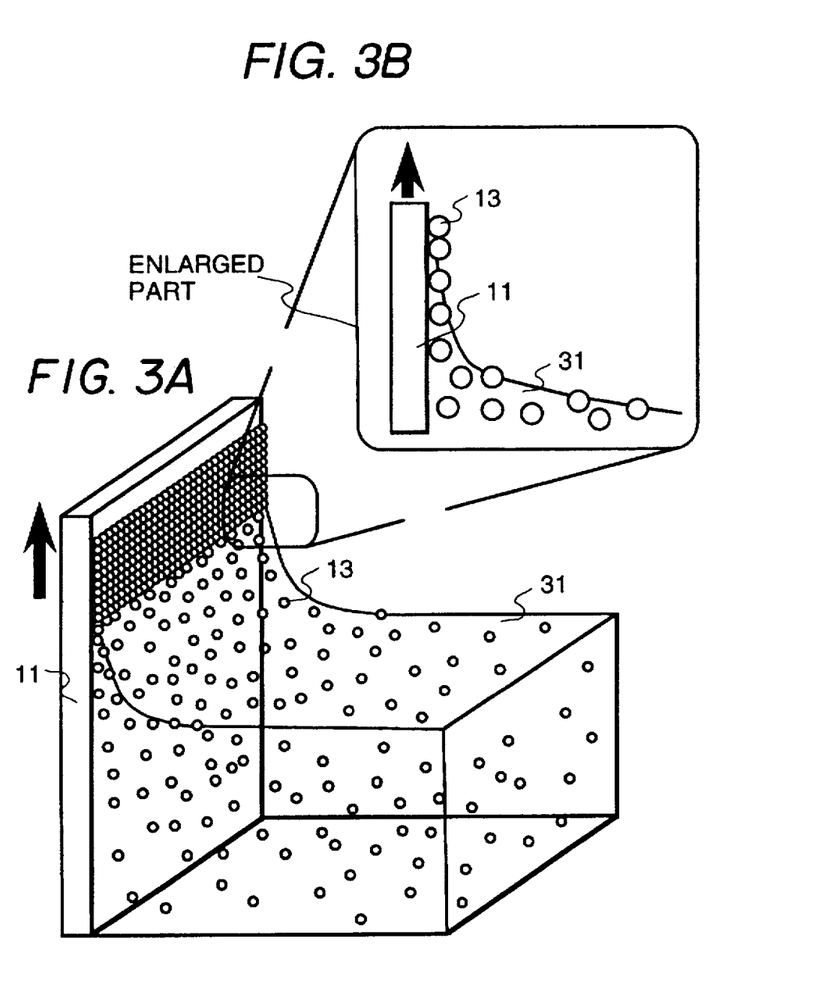
FIGS. 3A and 3B are diagrams showing a process of forming a single particle layer.

FIG. 3A shows the process of forming the single particle layer 14 with FIG. 3B show an enlargement. In the portion where the surface of the suspending solution 31 contacts the glass substrate 11 (the contact portion of the substrate/the solution/air), the suspending solution 31 containing LCMC 13 is raised up along the surface of the substrate due to wet-ability of the surface of the substrate. An attracting force due to surface tension (capillary force) acts between the LCMCs 13 partially immersed in the solution. The LCMCs are carried by the flow of the solution caused by evaporation and are accumulated at the contact portion of the substrate/ the solution/air to form the single particle film 14 (self-assembly method).

In the next step, by uniformly applying the medium 15 composed of gelatine and gum arabic onto the glass substrate coated with the single particle layer, the surface of the single particle layer 14 is made flat and the gaps between the capsule and the substrate and between the capsules themselves are filled with the medium 15. After curing the medium with heat or light irradiation, the process of forming single particle layer described above is repeated to form a light dispersion layer 16 composed of a laminated film of single particle layers 14 of the liquid crystal micro-capsules 13. Further, above the light dispersion layer, an ITO film is formed at room temperature through a sputtering method, and the ITO film is patterned in stripe-shapes so as to cross the lower electrodes at a right angle to form the upper signal electrodes 17.

Figure 2:
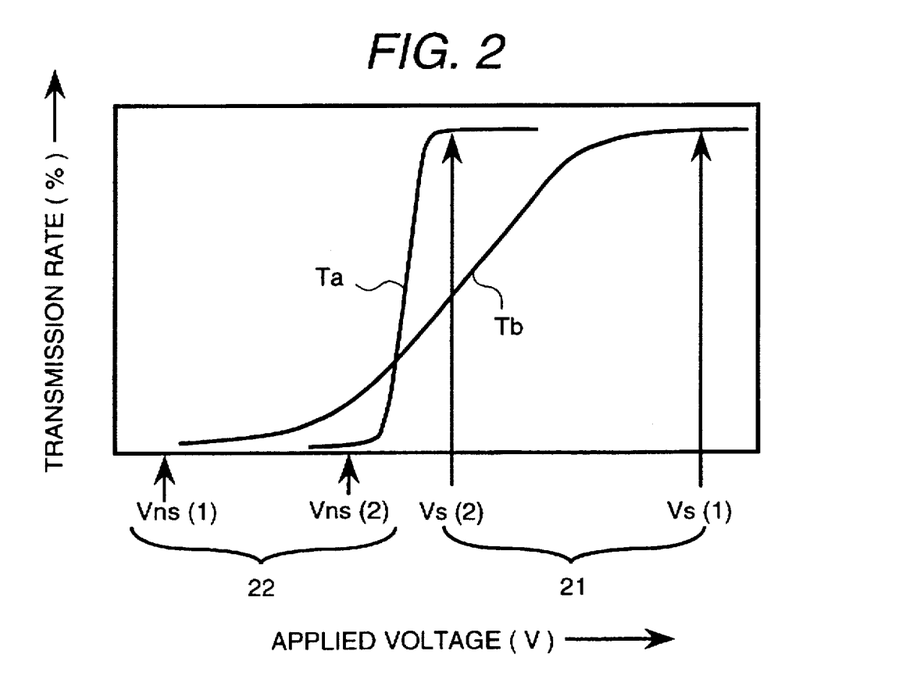
FIG. 2 is a graph showing dependence of transmission rate on effective voltage.

FIG. 2 shows the dependence of the transmission rate $T_a$ on the effective voltage in the liquid crystal display apparatus according to the present invention in comparison with the transmission rate $T_b$ in a conventional liquid crystal display apparatus. The threshold characteristic of the liquid crystal display apparatus according to the present invention is sharper than that of the conventional liquid crystal display apparatus, and the effect of the present invention is clearly shown.

Figure 4A:
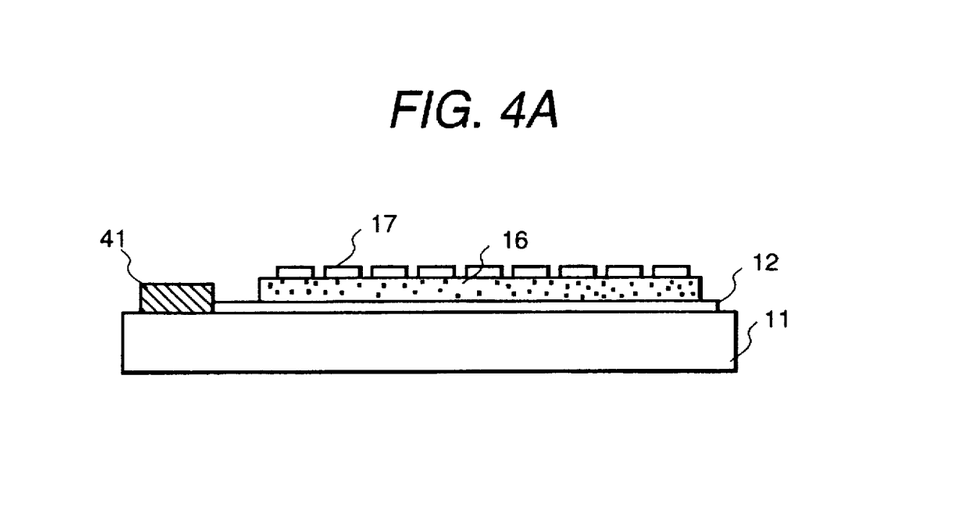
FIG. 4A is a diagram showing the construction of a liquid crystal display apparatus.
Figure 4B:
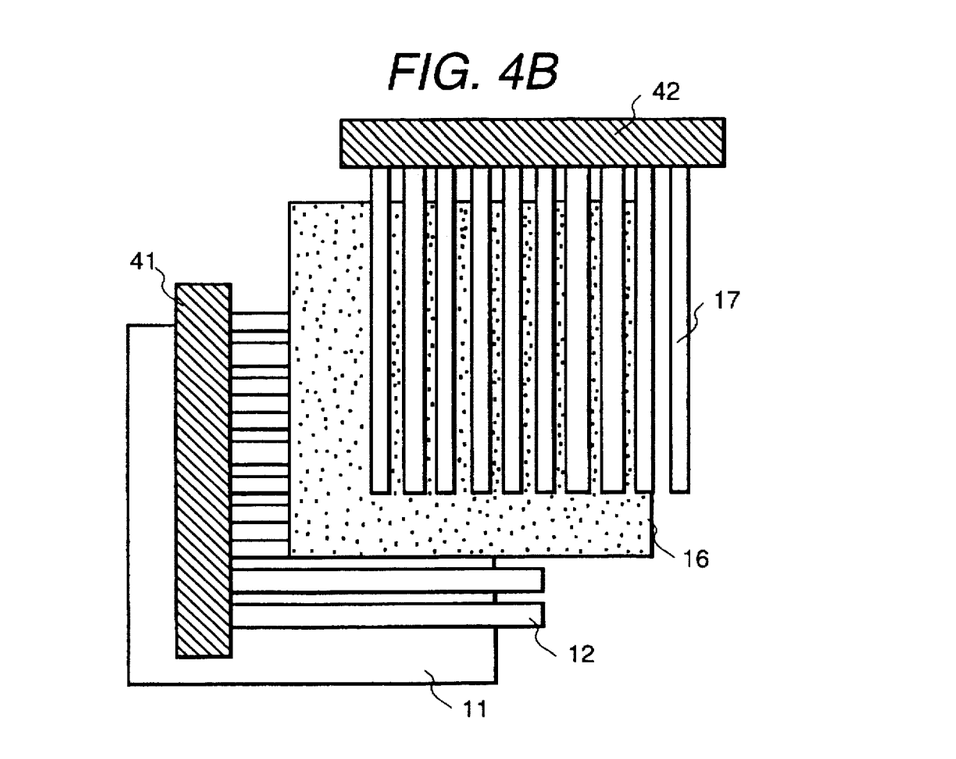
FIG. 4B is an exploded view of the apparatus of FIG. 4A seen from upper side.

FIG. 4A and FIG. 4B show the construction of an embodiment of a liquid crystal display apparatus in accordance with the present invention. The apparatus includes a substrate 11, a plurality of lower scanning electrodes 12 made of ITO, a scanning circuit 41 a light dispersion layer 16, a plurality of upper signal electrodes 17 made of ITO and is a signal circuit 42. In the liquid crystal display apparatus having the above construction, the number of scanning electrodes which can be driven with direct-multiplexed driving is determined by the sharpness of the transmission rate/voltage dependence shown in FIG. 2. As shown in FIG. 2, an effective voltage just before the time when the transmission rate starts increasing is indicated as a non-select voltage $V_{ns}$, and an effective voltage at the time when the transmission rate becomes the maximum is indicated as be a select voltage $V_s$. When the sharpness of the transmission rate/ voltage dependence is defined by $V_s/V_{ns}$, the number N of scanning electrodes which can be driven with direct-multiplexed driving is expressed by the following equation.

$$V_s/V_{ns}=(N^{1/2}+1)/(N^{1/2}-1)^{1/2}$$

Figure 5:
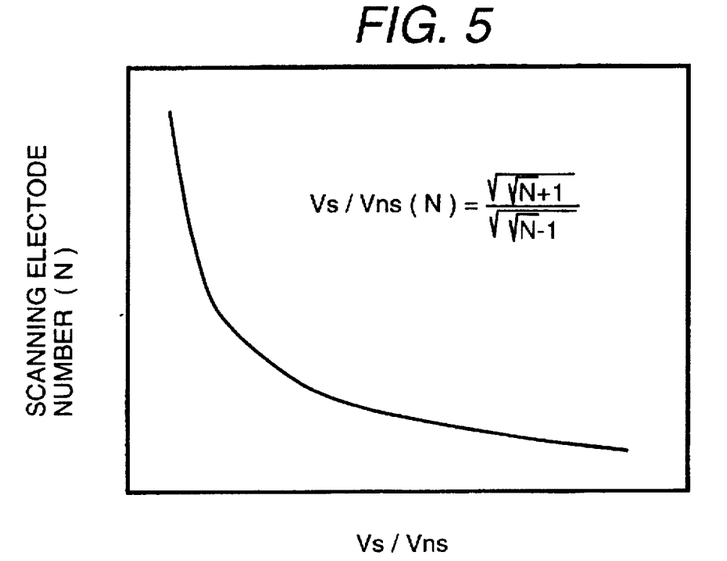
FIG. 5 is a graph showing the dependence of scanning electrode number on $V_s/V_{ns}$.

FIG. 5 shows the dependence of the scanning electrode number on $V_s/V_{ns}$ obtained from the above equation. The number of scanning electrodes increases as the value $V_s/V_{ns}$ decreases, that is, the transmission rate-to-voltage characteristic becomes sharper. A select voltage and a non-select voltage for the conventional apparatus are designated $V_s(1)$ and $V_{ns}(1)$, and a select voltage and a non-select voltage for the apparatus in accordance with the present invention are designated $V_n(2)$ and $V_{ns}(2)$ in FIG. 2. The following relation can be obtained.

$$V_{ns}(1)<V_{ns}(2)<V_n(2)<V_n(1)$$

Accordingly, the following relation can be satisfied.

$$V_s(2)/V_{ns}(2)<V_s(1)/V_{ns}(1)$$

Therefore, it is clear that the present invention makes the threshold characteristic sharper and the number of scanning electrodes which can be driven with direct-multiplexed driving in a PDLC can be increased.

Figure 6:
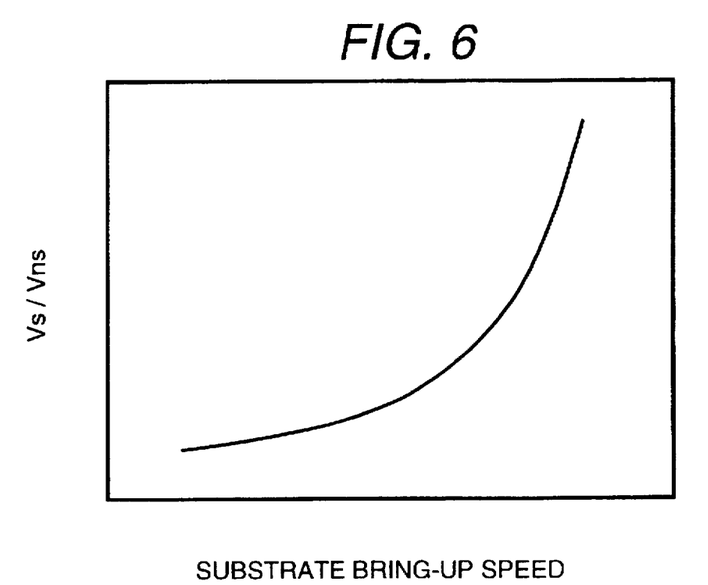
FIG. 6 is a graph showing the dependence of $V_s/V_{ns}$ on substrate bring-up speed.

FIG. 6 shows the dependence of the ratio $V_s/V_{ns}$ of the select voltage to the non-select voltage on the substrate bring-up speed for the liquid crystal display apparatus in accordance with the present invention. The ratio $V_s/V_{ns}$ decreases as the bring-up speed of the substrate decreases. Therefore, in order for the number of the scanning electrodes to be set to N in FIG. 4, the substrate must be brought up at a speed slower than the speed (maximum speed) needed to satisfy the ratio $V_s/V_{ns}(N)$. However, when the bring-up speed is unnecessarily lowered, it is unpractical because the time for forming the light control layer becomes long. Actually, the employed bring-up speed is 90% of the maximum bring-up speed.

Figure 7A:
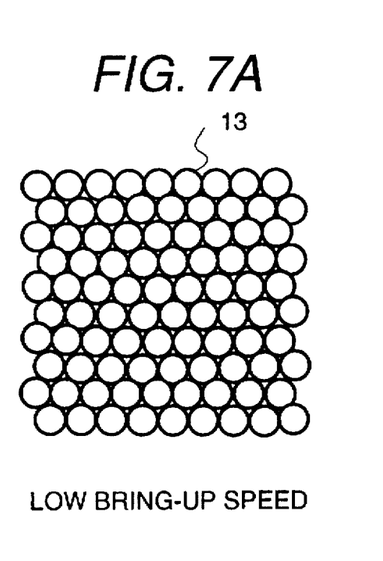
FIG. 7A shows an arrangement for a low substrate bring-up speed and FIG. 7B shows an arrangement for a high substrate bring-up speed.
Figure 7B:
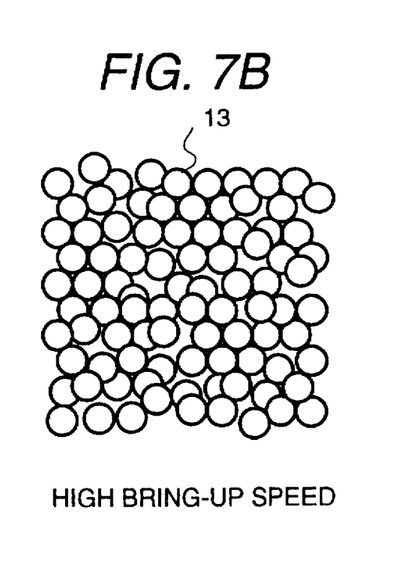
Figure 8:
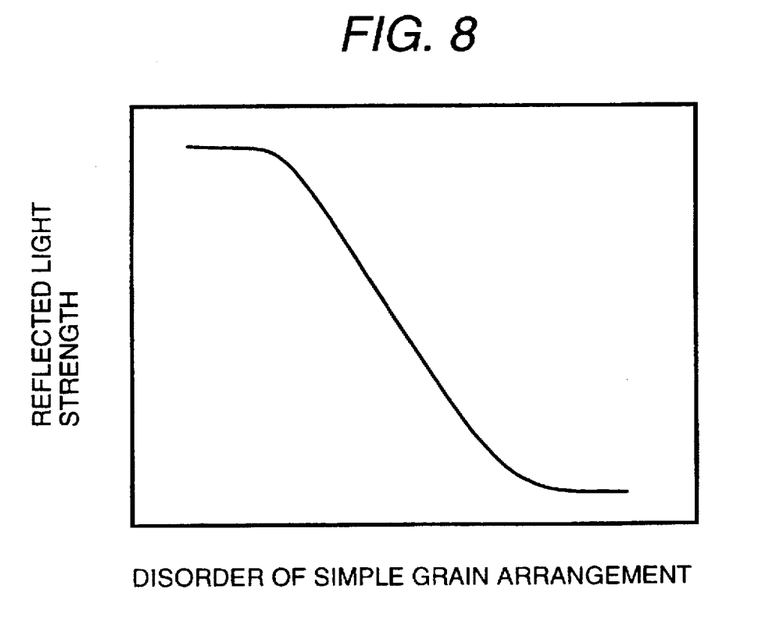
FIG. 8 is a graph showing the dependence of reflected light strength on the disorder of particle arrangement.
Figure 9:
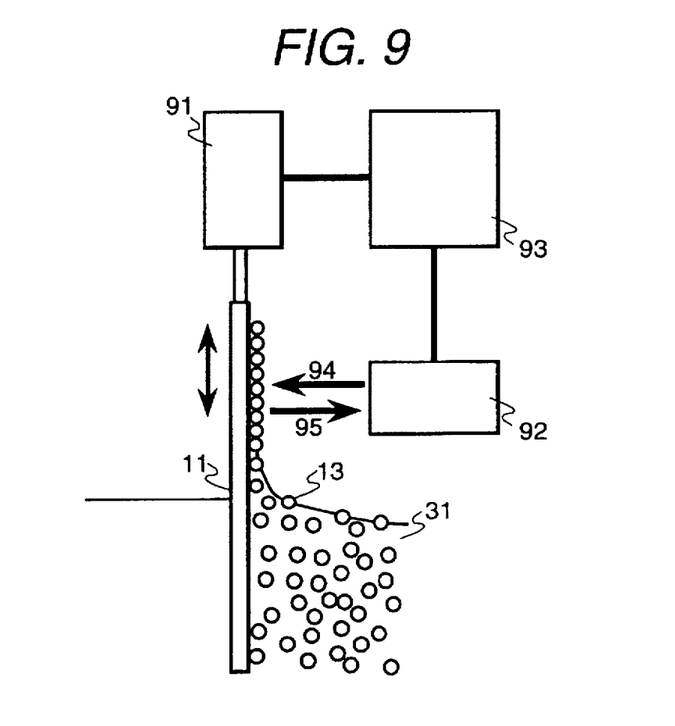
FIG. 9 is a schematic diagram showing the construction of a light dispersing layer manufacturing apparatus.

The reason why the rise time in the transmission ratio-to-voltage characteristic becomes more gradual as the bring-up speed is increased is that the arrangement of the liquid crystal micro-capsules (LCMCs) in the single particle layer becomes random, as shown in FIG. 7B, when the bring-up speed is too fast. That is, there is a one-to-one relationship between the transmission ratio-to-voltage characteristic and the disorder of arrangement in the single particle layer. Therefore, by measuring and controlling the disorder of the LCMC arrangement during bringing-up of the substrate, the transmission ratio-to-voltage characteristic of the liquid crystal display apparatus can be controlled. The reflected light strength can be utilized for measuring the disorder of the arrangement in the single particle layer. The reflected light strength decreases as the disorder of the arrangement increases, as shown in FIG. 8. Accordingly, by monitoring in real time the reflected light strength which corresponds to the disorder of the arrangement, it is possible to construct a light dispersing layer manufacturing apparatus which is capable of automatically correcting the disorder of the arrangement. FIG. 9 shows the construction of a light dispersing layer manufacturing apparatus composed of a substrate bring-up unit 91, a reflected light intensity monitor 92 and a substrate bringing-up speed controller 93. That is, the reflected light intensity monitor 92 irradiates an incident light beam 94 from an argon laser on the single particle layer 14, and the substrate 11 is brought up from the suspending solution 31 using the substrate bring-up unit 91 while the intensity of light 95 reflected from the single particle layer 14 is being measured by the reflected light intensity monitor 92. If a portion in which the reflected light intensity is lower than a pre-determined value is detected, the substrate 11 is moved down until the portion is re-immersed into the suspending solution. By maintaining the substrate 11 in the suspending solution 31 for a certain time period, the liquid crystal micro-capsules 13 accumulated on the substrate 11 are removed. The substrate 11 is again brought up to accumulate the liquid crystal capsules 13 on the surface of the substrate 11. The above process is repeated so that the reflected light intensity over the whole surface of the single particle layer 14 becomes greater than a pre-determined value. The aforementioned processes are automatically carried out by the substrate bringing-up speed controller 93. By doing so, it is possible to construct a light dispersing layer manufacturing apparatus which is capable of automatically correcting the disorder of the arrangement caused in the single particle layer 14 during bringing-up of the substrate.

Figure 10:
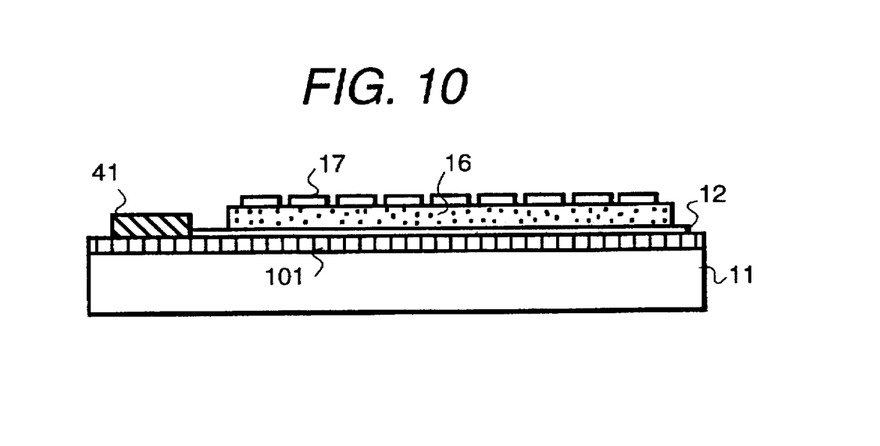
FIG. 10 is a diagram showing the cross-sectional construction of a reflecting type display apparatus.

FIG. 10 is a view showing the cross-sectional construction of an embodiment of a reflecting type display apparatus using a liquid crystal display in accordance with the present invention. A reflecting plate 101 made of an aluminum thin film having a film thickness of nearly 100 nm is formed on a substrate 11 made of corning 7056 or a plastic material through a sputtering method to form the liquid crystal display apparatus shown in FIG. 10. In accordance with the present invention, a light absorbing dye for absorbing visual light is added in the liquid crystal droplets to display an image by the so-called guest-host mode. That is, the image is displayed by utilizing a dark state which is realized using absorbing incident light by the light absorbing dye in the normal light dispersion and by reflecting transmitted light in the normal transmitting state.

The aforementioned reflecting type display apparatus, which can be driven with direct-multiplexed driving, can be made at reduced cost, since the construction of the apparatus is simple. Further, the apparatus can be driven using a battery since the electric power being consumed is small due to elimination of the need for a back light. Since the display apparatus has the above advantages, the display apparatus can be utilized for a personal portable information terminal, which is inevitably required to be driven by a battery, and a display apparatus for an indicator for electric appliance, such as washing machine or cooking machine.

As described above, according to the present invention, it is possible to provide a liquid crystal display apparatus of the light dispersion type, and a method of manufacturing a liquid crystal display apparatus, in which the transmission rate to an applied voltage sharply changes and which can be driven by direct-multiplexed driving using a liquid crystal of the light dispersing type.

What is claimed is:

1. A liquid crystal display apparatus comprising at least one transparent substrate, a pair of upper and lower electrodes disposed on the substrate, and a liquid crystal layer interposed between said pair of upper and lower electrodes, wherein said liquid crystal layer is formed of a plurality of laminated single particle layers of liquid crystal micro-capsules having a uniform size and being arranged in a two-dimensional crystal array, said liquid crystal (micro-capsule) micro-capsules being formed by cladding a liquid crystal droplet with a medium having a constant thickness.

2. A liquid crystal display apparatus according to claim 1, wherein said liquid crystal micro-capsules are made of nematic liquid crystal.

3. A liquid crystal display apparatus according to claim 2, wherein said liquid crystal micro-capsules are cladded with a medium composed of gelatine and gum arabic.

4. A liquid crystal display apparatus according to claim 2, wherein said nematic liquid crystal has a light absorbing dye added thereto.

5. A liquid crystal display apparatus according to claim 4, wherein said nematic liquid crystals are cladded with a medium composed of gelatine and gum arabic.

6. A liquid crystal display apparatus according to claim 1, wherein said liquid crystal layer includes a filling medium for making a surface of at least one of said single particle layers flats said filling medium filling gaps between adjacent ones of said liquid crystal micro-capsules in said at least one single particle layer.

7. A liquid crystal display apparatus according to claim 6, wherein said filling medium is composed of gelatine and gum arabic.

8. A liquid crystal display apparatus according to claim 7, wherein said liquid crystal micro-capsules are composing said single particle layer are composed of nematic liquid crystals.

9. A liquid crystal display apparatus according to claim 8, wherein said nematic liquid crystal is cladded with a medium composed of gelatine and gum arabic.

10. A liquid crystal display apparatus according to any one of claim 1 to claim 9, wherein one of said pair of electrodes comprise a plurality of scanning electrodes, and the other of said pair of electrodes comprise a plurality of signal electrodes crossing the direction of said scanning electrodes at a right angle.

11. A liquid crystal display apparatus according to claim 10, wherein said liquid crystal layer is driven by direct multiplexed driving produced by signals supplied to said plurality of scanning electrodes and said plurality of signal electrodes in a time-sharing manner.

12. A liquid crystal display apparatus according to claim 11, wherein a reflecting plate is formed on said substrate.

13. A personal portable terminal using the liquid crystal display apparatus according to claim 12.

14. A liquid crystal display apparatus according to claim 1, wherein said liquid crystal display apparatus is manufactured in accordance with steps which include:

suspending liquid crystal micro-capsules having a uniform particle diameter in pure water to form a suspending solution, immersing said substrate in said suspending solution;

forming a first single particle layer of said liquid crystal micro-capsules in a two-dimensional array on said substrate by withdrawing said substrate from said suspending solution at a constant speed, applying a filling medium onto said first single particle layer to make a surface of said first single particle layer flat and to fill a gap between the liquid crystal micro-capsules in said first single particle layer and said substrate and to fill gaps between adjacent ones of said liquid crystal micro-capsules in said first single particle layer, and laminating said first single particle layer and at least a second single particle layer, formed in accordance with the aforementioned steps, to form said liquid crystal layer, said first and second single particle layers having said filling medium disposed therebetween.

15. A liquid crystal display apparatus according to claim 1, wherein said liquid crystal micro-capsules are arranged at regularly spaced intervals within said two-dimensional crystal array.

16. A liquid crystal display apparatus comprising:

at least one transparent substrate;

a pair of upper and lower electrodes disposed on the substrate; and a liquid crystal layer interposed between said pair of upper and lower electrodes, wherein said liquid crystal layer is formed of a plurality of laminated single particle layers of liquid crystal micro-capsules having a uniform size and being arranged in a two-dimensional crystal array.

17. A method of manufacturing a liquid crystal display apparatus, comprising the steps of:

suspending liquid crystal micro-capsules having a uniform particle diameter in pure water to form a suspending solution;

immersing said substrate in said suspending solution;

forming a single particle layer of said liquid crystal micro-capsules in a two-dimensional array on said substrate by withdrawing said substrate from said suspending solution at a constant speed;

applying a filling medium onto said single particle layer to make the surface of the single particle layer flat and fill a gap between said liquid crystal micro-capsule and said substrate and gaps among said liquid crystal microcapsules; and laminating a plurality of said single particle layers filled with said filling medium.

18. A method of manufacturing a liquid crystal display apparatus according to claim 17, wherein said constant speed of withdrawing the immersed substrate is controlled so as to make the two-dimensional crystal arrangement of said liquid crystal micro-capsules uniform to satisfy a desired sharpness in a transmission rate-to-voltage characteristic of the liquid crystal display.

19. A method of manufacturing a liquid crystal display apparatus according to claim 17, wherein the speed of withdrawing the immersed substrate is controlled so as to make a reflected light intensity of said single particle layer of liquid crystal micro-capsules higher than a preset value by measuring the reflected light intensity of said single particle layer of liquid crystal micro-capsules just above a liquid surface of said suspending solution during the withdrawing of said substrate; and when the reflected light intensity of said single particle layer of the liquid crystal micro-capsules is detected to be lower than the preset value, said substrate is first moved down in the suspending solution to remove the liquid crystal micro-capsules accumulated onto said substrate and then brought up again at the constant speed to re-arrange the liquid crystal micro-capsules so that the reflected light intensity becomes higher than the preset value.

20. A method of manufacturing a liquid crystal display apparatus according to claim 17, further comprising:

forming said liquid crystal micro-capsules by cladding a liquid crystal droplet with a medium having a constant thickness.

21. A method of manufacturing a liquid crystal display apparatus according to claim 17, further comprising:

forming a pair of upper and lower electrodes on said substrate.

22. A method of manufacturing a liquid crystal display apparatus according to claim 17, wherein said liquid crystal micro-capsules are made of nematic liquid crystal.

23. A method of manufacturing a liquid crystal display apparatus according to claim 17, wherein said filling medium is composed of gelatine and gum arabic.

* * * * *